Aug. 23, 1927.
J. F. RAYMOND
1,640,094
TOOL FOR WEEDING, CULTIVATING, AND LIKE PURPOSES
Filed March 29, 1926
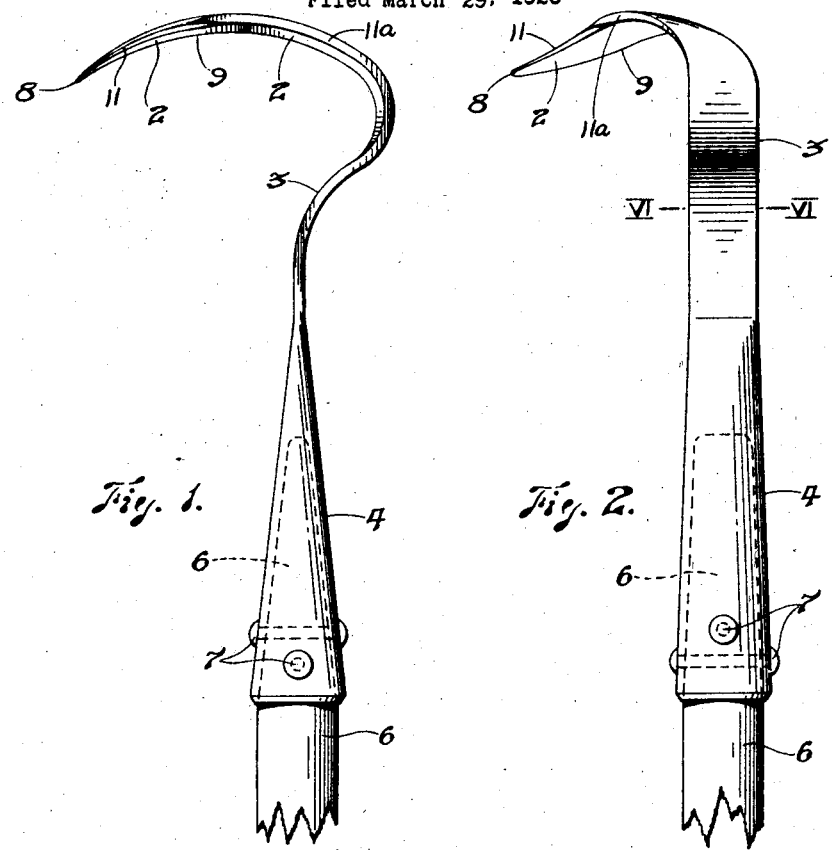
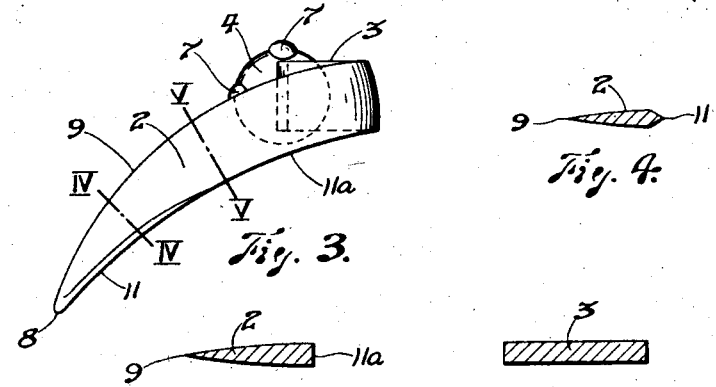
Inventor:
Joseph Frederick Raymond Patented Aug. 23, 1927.

UNITED STATES PATENT OFFICE.

JOSEPH FREDRICK RAYMOND, OF SURREY HILLS, MELBOURNE, VICTORIA, AUSTRALIA.

TOOL FOR WEEDING, CULTIVATING, AND LIKE PURPOSES.

Application filed March 29, 1926, Serial No. 98,252, and in Australia June 27, 1925.

This invention relates to an improved hand operated gardening tool which may be used with distinct advantage for weeding, cultivating, planting, thinning, transplanting, and such like agricultural or horticultural purposes.

The object of the invention is to provide an extremely simple, inexpensive and highly efficient tool whereby operations of the nature indicated are greatly facilitated and whereby delicate gardening operations may be readily performed without risk of damage to the plants.

A characteristic feature of the invention resides in the sideward bending or offsetting of the pointed end of the tool, as hereinafter described, so that the work in hand is clearly visible to the operator and the tool may be effectively operated close to, and between, plants without risk of damage thereto.

Referring to the drawings which form part of this specification:—

Fig. 1 is a side view of the improved tool.

Fig. 2 is a rear view.

Fig. 3 is a head on view.

Fig. 4 is a section, on an enlarged scale, taken on the line IV—IV in Fig. 2.

Fig. 5 is a section, on an enlarged scale, taken on the line V—V in Fig. 3.

Fig. 6 is a section, on an enlarged scale, taken on the line VI—VI in Fig. 2.

The improved tool comprises a blade portion 2, an intermediate portion 3, and a socket or ferrule 4, which is preferably integral with said blade and intermediate portions.

The socket or ferrule 4 is adapted to receive an end of the tool handle 6, which may be of any convenient length, and may be secured in the socket by pins 7. The socket merges at its forward end into the said intermediate portion 3 which is substantially flat, the width thereof being considerably greater than its thickness.

The said flat intermediate portion of the tool is preferably bent backwardly and then forwardly to the blade portion 2 which is of hook like formation and is curved sidewardly to an offset point 8, the width of the blade gradually decreasing from said intermediate portion 3 to said point.

The sideward bending or offsetting of the pointed end of the tool places said pointed end in a different lateral position to the intermediate and socket portions of the tool so that the operator's view of the work is unobstructed and the offset point may be conveniently manipulated in close proximity to young plants without risk or damage thereto. Likewise weeding and other cultivating operations of a relatively delicate nature may be performed with ease and despatch.

In cross section the blade portion 2 of the tool is preferably bevelled towards one side throughout the width of the blade as seen in Figures 4 and 5, to thereby form a relatively sharp or cutting edge 9 which preferably extends throughout the length of the blade or from the offset point 8 to the rearwardly bent intermediate portion 3. This cutting edge 9 is preferably formed on the right hand or leading side of the blade, whereas the point of the latter is offset in the opposite direction or towards the left.

The left hand or trailing side edge of the hooklike blade is also preferably bevelled or chamfered to form a relatively sharp edge 11 (as seen in Figure 4) which, however, extends only for a short distance rearwardly from the offset point 8, the remaining portion 11ª of this side edge being preferably square or disposed at right angles to the width of the blade as seen in Fig. 5.

It will be evident from the foregoing that the width of the curved hook-like blade 2 gradually decreases from the rearwardly bent intermediate portion 3 to the pointed outer end 8 which is offset by bending the blade sidewardly from said intermediate portion and the socket 4.

The invention provides an extremely useful gardening tool which may be used with great advantage in many cases where an ordinary hoe is unsuitable. The offset point 8 of the tool is admirably adapted for shallow digging and like operations whilst by laying the tool upon its longer or right hand cutting edge 9 it may be conveniently used for scraping, levelling and the like. Moreover the improved tool is extremely simple in construction and may be produced at very low cost.

Having now described my invention what I claim as new and desire to secure by Letters Patent is:—

1. An improved hand operated tool for weeding, cultivating and like purposes, comprising a socket portion which is adapted for attachment to a tool handle; an intermediate portion extending sidewardly from said socket portion; and a blade portion having a leading side and a trailing side and which is arched lengthwise into a hook-like form and decreases in width towards its outer end which is pointed, said hook-like blade portion being offset sidewardly in the direction of its width, the leading side of the blade having a relatively sharp beveled edge extending substantially throughout its length and the blade being offset in the direction of its trailing side.

2. An improved hand operated tool for weeding, cultivating and like purposes, comprising a socket portion which is adapted for attachment to a tool handle; an intermediate portion extending sidewardly from said socket portion; and a blade portion having a leading side and a trailing side and which is arched lengthwise into a hook-like form and decreases in width towards its outer end which is pointed, said hook-like blade portion being offset sidewardly in the direction of its width, the leading side of the blade having a relatively sharp beveled edge extending substantially throughout its length and the blade being offset in the direction of its trailing side which is provided with a relatively sharp beveled edge extending from the pointed outer end of the blade for a relatively short distance along the blade.

In testimony whereof I affix my signature.

JOSEPH FREDRICK RAYMOND.